(No Model.)

O. A. NORLUND.
FRUIT GATHERER.

No. 590,935. Patented Sept. 28, 1897.

Witnesses
Edwin G. McKee
Edwin Cruse

Inventor
Olof A. Norlund
By his Attorneys,
C. A. Snow & Co.

THE NORRIS PETERS CO., PHOTO-LITHO., WASHINGTON, D. C.

UNITED STATES PATENT OFFICE.

OLOF A. NORLUND, OF CEDAR RUN, PENNSYLVANIA, ASSIGNOR OF ONE-HALF TO GEORGE A. GAMBLE, OF SAME PLACE.

FRUIT-GATHERER.

SPECIFICATION forming part of Letters Patent No. 590,935, dated September 28, 1897.

Application filed May 17, 1897. Serial No. 636,959. (No model.)

*To all whom it may concern:*

Be it known that I, OLOF A. NORLUND, a citizen of the United States, residing at Cedar Run, in the county of Lycoming and State of Pennsylvania, have invented a new and useful Fruit-Gatherer, of which the following is a specification.

This invention relates to that class of fruit-gatherers and pruning-shears in which the shears are mounted on the end of a long pole and operated by means of a cord, which extends downwardly to the lower end of the pole, to cut the branches or the stems of the fruit, the fruit then dropping into a conveyer which extends down to a suitable receptacle below.

The object of the invention is to provide a device of this character which is simple in construction and efficient in operation and which may be easily handled to cut the branches or the fruit conveniently, no matter in what position they may be located.

The invention consists in the several details of construction and combination of parts, as will be hereinafter fully described, and particularly pointed out in the claims.

Figure 1:
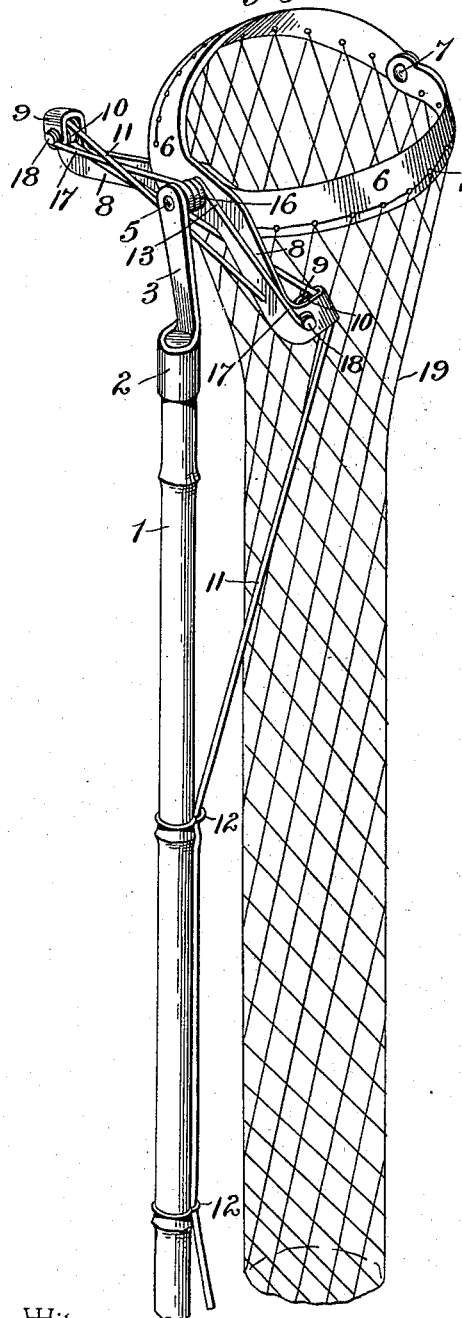
Figure 2:
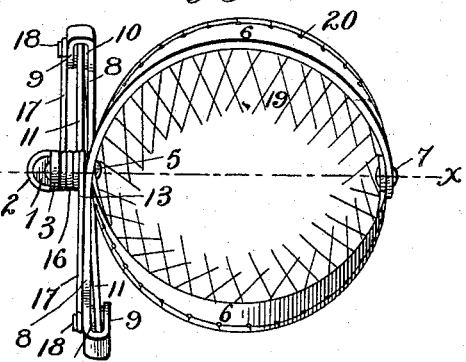
Figure 3:
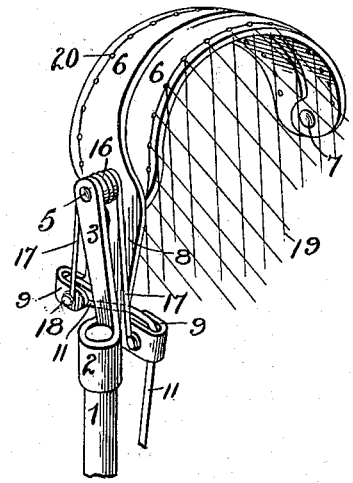
Figure 4:
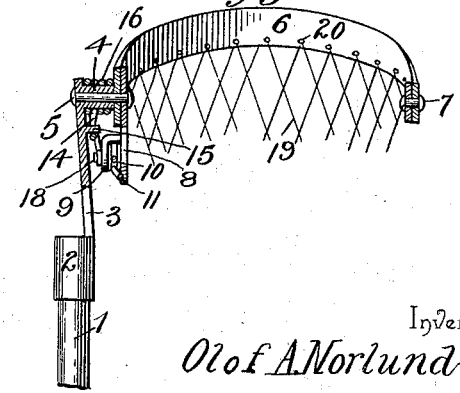

In the drawings, Figure 1 is a perspective view of the device, showing the shears open and the handle and conveyer partly broken away. Fig. 2 is a plan view of the shears open. Fig. 3 is a perspective view of the shears closed, the handle and conveyer being broken away. Fig. 4 is a section on the line *x x* of Fig. 2.

Similar reference-numerals indicate similar parts in the several figures.

1 indicates the handle, which is preferably of cane, but may be of any other light material possessing the required strength. On the upper end of the handle a socket 2 is firmly secured, and from this socket an arm 3 extends upwardly and is provided with a stud 4 at its upper end. This stud is provided with a central bore, which also extends through the arm and receives a pin 5, which is secured therein.

6 indicates the jaws, which are semicircular in form and are pivotally connected together at one end by means of a pin 7. The other ends of the jaws cross each other and are pivoted on the pin 5. The cutting edges of the jaws are oppositely beveled, and one jaw works closely within the other to effect the cutting, in a manner similar to that of an ordinary pair of shears.

The ends of the jaws which are pivoted on the pin 5 are provided with integral arms 8, the outer ends of which are bent to form spaced ears 9, which extend at a right angle to the main portion of the arms, and between the spaced ears pulleys 10 are journaled.

11 indicates a cord which is secured at one end to one of the arms 8 and from thence extends over and under the pulley 10 on the other arm and thence over the pulley 10 on the arm to which its end is attached and then leads downwardly through suitable guiding-eyes 12, attached to the handle.

13 indicates a spring which is formed from a single piece of wire bent midway its length to form a loop 14, which fits over a stud 15, projecting from the arm 3 just below the stud 4, and the two portions of the wire are then reversely coiled around the stud 4, as indicated at 16, and the ends 17 of the wire extend in opposite directions and are secured to studs 18 on the lower ends of the respective arms. The normal tendency of the spring is to hold the jaws in their open position.

19 indicates a conveyer, which is preferably of netting, although it may be of cloth or any other suitable material, and this conveyer is secured at its upper end to the lower edges of the jaws, which latter are provided with suitable holes 20 for this purpose. The conveyer will be of any suitable length and the fruit will drop directly into it when the stems are severed by the shears.

When the device is used for pruning, the conveyer can be easily removed from the shears, as it will not be required. When, however, the device is used as a fruit-gatherer, the jaws serve as a mouthpiece for the conveyer and the fruit will drop directly into it when severed by the jaws. The device is exceedingly light, and as it occupies but very little space it can be easily inserted between the limbs of the tree to gather the fruit irrespective of the location of the latter. The mechanism is exceedingly simple in its construction, and therefore not liable to get out of order, and the jaws can be easily sharpened whenever necessary. The conveyer may be made in sections, if desired, in order to increase or diminish its length, as circumstances may require.

It will be understood that changes in the form, proportion, and minor details of construction may be resorted to without departing from the spirit or sacrificing any of the advantages of this invention.

Having thus described the invention, what I claim is—

1. In a fruit-gatherer, the combination of a handle, a pair of semicircular jaws pivoted together at one end and having their other ends crossed and pivotally connected to the upper end of the handle, arms extending from the crossed ends of the jaws and being integral therewith, pulleys journaled in the ends of said arms, springs connected to the handle and arms to normally hold the jaws open, a cord secured to one of the arms and working over the pulleys to close the jaws, and a flexible conveyer connected directly to the jaws, substantially as described.

2. In a fruit-gatherer, the combination of a handle, an arm secured at its upper end, a stud projecting from the arm, a pin secured in the stud, a pair of semicircular jaws pivotally connected together at one end and having their other ends crossed and pivoted on the said pin, arms integral with the crossed ends of the jaws, a pulley journaled in the end of each arm, an operating-cord connected to one arm and working over the said pulleys, a reversely-coiled spring seated on the said stud and connected to the said arms, and a conveyer connected to the jaws, substantially as described.

3. In a fruit-gatherer and pruning-shears, the combination of a handle, an arm secured at its upper end, a stud projecting from the arm, a pin secured in the stud, a pair of semicircular jaws pivotally connected together at one end and having their other ends crossed and pivoted on the said pin, arms integral with the crossed ends of the jaws, a pulley journaled in the end of each arm, an operating-cord connected to one arm and working over the said pulleys, a reversely-coiled spring seated on the said stud and connected to the said arms, substantially as and for the purpose specified.

In testimony that I claim the foregoing as my own I have hereto affixed my signature in the presence of two witnesses.

OLOF A. NORLUND.

Witnesses:
JOHN HILBORN,
JOHN M. CALLAHAN.